Feb. 15, 1944.    J. B. LENNINGTON    2,341,999
METHOD OF MOLDING
Filed Nov. 28, 1939    2 Sheets-Sheet 1
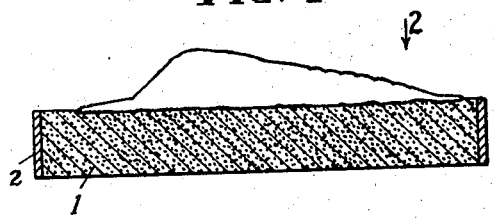
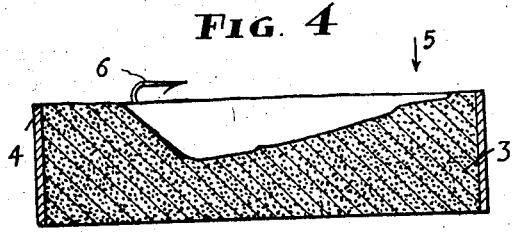
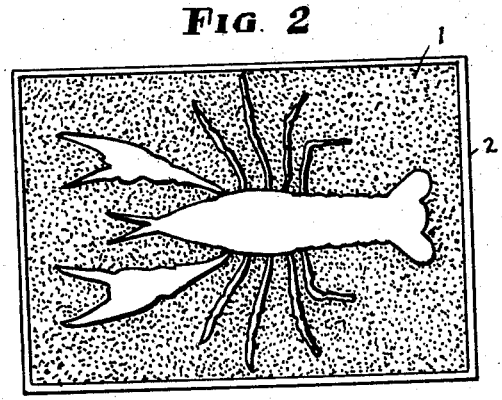
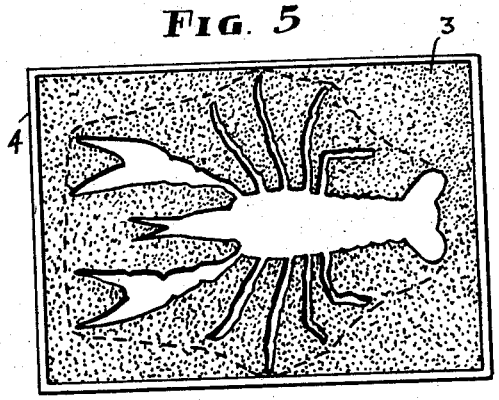
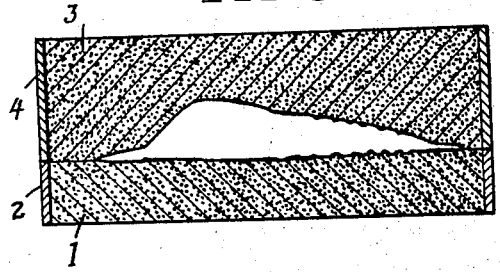
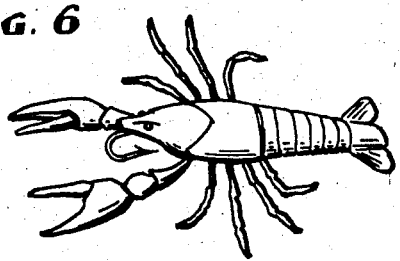
INVENTOR.
JOSEPH B. LENNINGTON
BY
ATTORNEY.

Feb. 15, 1944.     J. B. LENNINGTON     2,341,999
METHOD OF MOLDING
Filed Nov. 28, 1939     2 Sheets-Sheet 2

INVENTOR.
JOSEPH B. LENNINGTON
BY Thomas R. Ryan
ATTORNEY.

Patented Feb. 15, 1944

2,341,999

UNITED STATES PATENT OFFICE 2,341,999

METHOD OF MOLDING

Joseph B. Lennington, Mount Pleasant Township, Delaware County, Ind.

Application November 28, 1939, Serial No. 306,450

4 Claims. (Cl. 18—55)

This invention has to do with the providing of instrumentalities to be used in connection with the handling and treatment of latex for the purpose of transforming the latter into articles of rubber; the aim being to provide a method of making a mold wherein to so accomplish the transformation that the resultant article is possessed of qualities of wall and surface structure, and of resiliency and color which are requisite for certain objectives presently to be referred to.

In my efforts to accomplish the producing in rubber, of a true reproduction or copy of a natural object such as a fish, small animal, insect, botanical specimen or the like, there has been encountered the problem of how to make a mold which while being effective in accomplishing the reproduction in a matrix which will have been made from the actual natural object which is the subject of copy, the range of selection as to the kind of object to be reproduced, is very extensive. In the present instance I have shown the invention as being applied to use in the producing of an article of that class intended for use as a lure.

The objects of my invention are accomplished by, and it consists of the new method of making a mold by the use of a natural object as a pattern, and in which said mold is to be produced a casting in latex. The invention is described in the following specification and defined in the appended claims. Instrumentalities concerned in the practice of my new method are illustrated diagrammatically in the annexed drawings.

In describing my invention as it is exemplified in the simpler form I have selected as the object to be simulated, a crawfish, it lending itself to be reproduced by the employment of a single one-piece mold.

In the drawings—

Figure 1 is a sectional view of the bed mass as retained in a suitable frame, and upon which said bed mass is reposed the pattern object of which a facsimile is to be made.

Figure 2 is a top plan view taken in the direction of arrow 2 in Figure 1.

Figure 3 is a sectional view showing the mold mass as it appears when deposited upon the pattern object as the latter lies in its position reposed upon said bed mass.

Figure 4 is a sectional view of the mold mass as it appears after it will have been removed from the position as in Figure 3 and after it will have been inverted and the pattern object removed therefrom, and the primary charge of latex will have been introduced therein.

Figure 5 is a top plan view in the direction of arrow 5 in Figure 4; the broken line indicating the boundary of the flow of the latex when the final charge of latex will have been deposited.

Figure 6 is a view of the image as produced by the use of my new mold.

The practice of my invention, in the instance of a single mold adaptation, consists of the procedure as follows:

The natural object, for example, a crawfish which will have been killed, suitably cleaned and dried, is subjected to the application thereto, either by brushing or spraying, preferably the latter, a film of clear thin oil, every part and detail of the said object being covered by said oil. Next, I apply to the said object, either by brushing or spraying, preferably the latter, a light coating of clear lacquer, seeing to it that every part and detail of the object is covered. Time is given for the coating of lacquer to harden. After this coating of lacquer will have hardened, a second coating of lacquer is applied in a manner similar to that above described. After this second coating of lacquer will have hardened, the object is in readiness as a pattern. It may be designated as the pattern object.

I prepare a bed mass 1 which is of suitable composition and plasticity that the pattern object may be impressed thereon, and which said mass is retained by a usual frame 2. The pattern object is now disposed upon the bed mass whereon it rests stably in position. Then I cover the pattern object to a depth of about twice its thickness with a liquid solution of molding plaster consisting of lime slaked to the consistency of thick cream and which is left to set until it will have become solid. For convenience in limiting the size of the mold mass 3 constituted as described I provide retaining frame 4.

In describing my invention as it is practiced in instances where both sides of the natural object are to be simulated, a fish is selected as the article to be reproduced.

Figure 7:
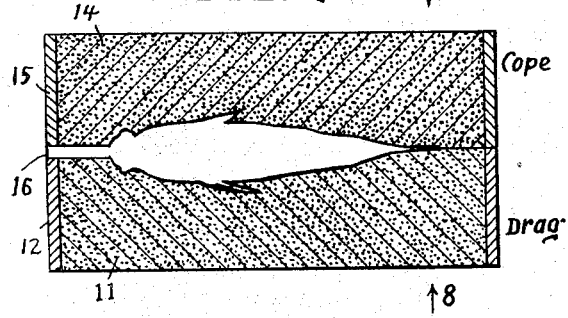

Figure 7 is a central longitudinal sectional view of a divided or two-piece mold which will have been formed about the pattern object, the said mold comprising mold mass 11 retained in frame 12 and which is designated as the drag; and a mold mass 14 retained in frame 15 and which is designated as the cope.

Figure 8:
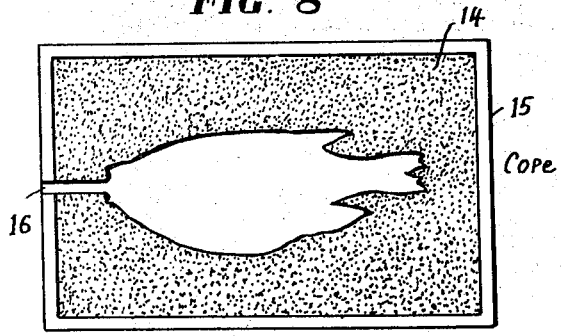

Figure 8 is a bottom plan view of the cope, as seen in the direction of arrow 8 in Figure 7.

Figure 9:
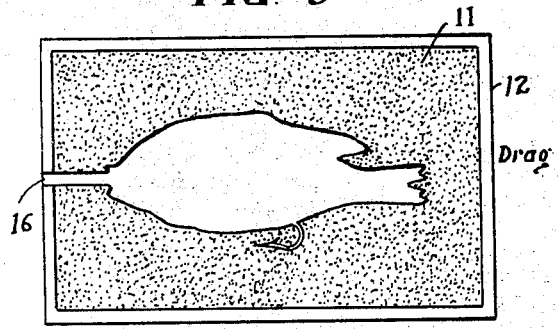

Figure 9 is a top plan view of the drag, as seen in the direction of arrow 9 in Figure 7, the pattern object having been removed and the primary charges of latex having been introduced, and the hook disposed in place.

Figure 10:
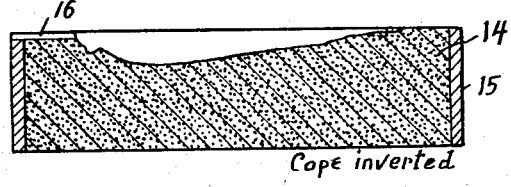

Figure 10 is a central longitudinal sectional view of the cope in inverted position, the primary charge of latex having been deposited in the matrix.

Figure 11:
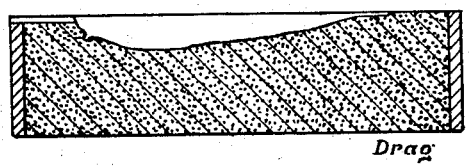

Figure 11 is a central longitudinal sectional view of the drag, the primary charge of latex having been deposited in the matrix.

Figure 12:
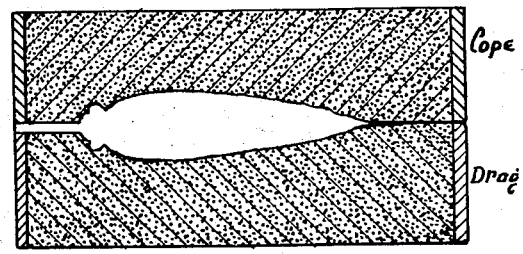

Figure 12 is a central longitudinal sectional view of the mold as it appears with the cope and drag in united relation, the final charge of latex having been deposited.

Figure 13:

Figure 13 is a view of the reproduction or image which will have been created according to my new invention.

Referring now to the one-piece mold illustrated in Figures 1, 2, 3, 4 and 5.

Coincident with the moment that the plaster mass 3 aforesaid will have reached the peak of its temperature, the heat thereof, acting upon the oil film and lacquer sheathing of the pattern object it is thought so affects the sheathing that whereas it will have been transferred, as it were, to the plaster, the perfection of the surface of the matrix which will have been formed, is not affected, there is no tendency of the sheathing ingredients to adhere to the object surfaces. The hardened lacquer film-like envelope so functions that as the plaster is applied, the envelope will have effected a perfectly surfaced impression or matrix—capturing the precise hair-line make-up of every part and detail of the pattern object; and the oil will have prevented adherence of the lacquer to the pattern object.

This lacquer film-like envelope endures a period of time sufficient that the plaster mass that will have been applied thereto will have become sufficiently set, that there is no deformation of the matrix when the pattern object is removed.

No further function is imputed to the lacquer film, other than that it lends itself to becoming denatured and disintegrated. This denaturing and disintegrating is thought to ensue within a short time after the plaster will have become set, the result being that whereas the film-like envelope has been transferred to the plaster mass, and it has made a perfect matrix, and it having become inert and disintegrated, it disappears when the object is removed. The above phenomena is considered as important in the fact that whereas a matrix of exquisite perfection in copying with precision every part and detail of the pattern object is obtained, a matrix of equal perfection may be obtained when a mold mass 3 is applied to a rubber facsimile which will have been treated to constitute a pattern object as above described.

The assembly consisting now of the bed mass 1 and the mold mass 3 as in Figure 3, is now inverted, and the bed mass is lifted off. Now, upon removing of the pattern object from the mold mass 3 (see Figure 4) there will have been constituted a matrix of that perfection necessary for the production of a facsimile.

As a precaution against accidental presence of foreign particles after the pattern object will have been removed as aforesaid, the matrix is subjected to being swept, as by a soft brush or preferably by a suitable air jet, before the procedure of depositing the latex and the handling thereof is taken. The said procedure is as follows: The mold mass 33 which is now in the position as indicated in Figure 4 is in readiness to receive the latex. Pour into the matrix and to shallow depth, a charge of latex, and then work it as with a brush or the like, so that it will have filled every portion of the said matrix.

This working of the latex is continued until all air bubbles shall have been expelled. When this charge of latex will have thickened or coagulated until it becomes transparent, which is ordinarily in about two minutes, a further charge of latex solution is deposited to a depth of about one half of the pattern object. When the matrix content so provided will have settled or shrunken—as it were—the angler's hook 6 is disposed in place as shown. Then I add a final charge of the latex, flowing same on the previously constituted matrix content until the surface line of the said matrix will have been reached.

In the introduction of the latex into every surface of the matrix, dehydration commences immediately, and by the capillary action of the plaster mass, the latex is transformed into the density desired and to set status. Also this capillary action draws the latex to and holds it in said status; so that regardless of the subsequent procedure of additional charges of latex, the verity of external or body posture of the cast is assured.

The process of curing now proceeds, the time required being variable, depending upon atmospheric conditions with regard to moisture and temperature. In ordinary dry atmosphere and at a temperature of sixty to seventy degrees the latex content will cure in about two hours, the approximately exact time required depending upon the bulk of the said content. The reproduction so made, besides being capable of easy removal from the matrix, is of engaging color, full of form, and perfect in surface configuration, and is possessed of a peculiar resiliency most appealing to the sense of touch.

The reproduction may now be removed from the matrix by simply working it slightly right and left and by pulling it free from its position. The thin web like integument formed by such slight portion of the latex which will have overflowed the surface of the mold mass immediately at the edges of the matrix, is manually clipped as by scissors or the like. The boundary lines of said integument are indicated by the broken lines in Figure 5.

The surfaces of the matrix having been perfect in every part and detail, and embodying precisely the surface contours and configurations of the pattern object, the reproduction therefrom is accordingly of such verity that it constitutes a facsimile that is deceptive. The reproduction may be used if desired, as a pattern for subsequent formations, in lieu of the original pattern object from which it was made. A reproduction so used as a pattern is subjected to being treated with the oil film, and to the lacquer coatings and in the same manner as hereinbefore described.

The latex castings produced by my new mold, besides having fullness and perfection of form, are possesed of a peculiarly engaging color which seems to accentuate the definition of all surface delineations of the object. This feature together with the feature of the certain peculiar resiliency of the body, distinguishes the reproduction accomplished by my invention, from previous reproductions in rubber wherein processes involving application of high temperatures, pressures, and mold masses of dense material are used.

In instances wherein a divided mold is used, and wherein is to be created a reproduction of an object, such as a fish, the procedure is as follows; reference being now had to Figures 7 to 12.

To the object, for example, a fish which will have been killed, cleansed and dried, I apply a light coating or film of thin clear oil, taking care that every part and detail of the pattern object is covered. Next I apply to the pattern object a light coating of clear lacquer, being careful that every part and detail of the object is covered. Time is now given for the lacquer to harden. Then a second coating of lacquer is applied in manner the same as above described. I now prepare a bed mass consisting of a liquid solution of molding plaster slaked to a suitable consistency as to plasticity. This bed mass 11, retained within the confines of a flask frame 12 may be designated as the drag. The pattern object is now disposed upon the surface of the bed mass. Suitable pressure is now applied throughout the areas of the several portions of the object so that it is directly impressed equably upon said bed mass, in this instance, to one half the thickness of the pattern object. In the meantime the bed mass will have suitably hardened.

A flask frame 15 is now disposed in place on top of the frame 12 of the drag, as shown in Figure 7, and then I cover the pattern object to a depth of about twice its thickness with a liquid solution of lime slaked to the consistency of cream and it is permitted to harden until it will have become solid. This composition confined in frame 15 is designated as the cope.

The succeeding steps are similar in nature and purpose, to those hereinbefore described in the instance of the one-piece mold; and there are present the same features, namely—the interrelated steps wherein treatment of the natural object which is to form the subject of copy has to do with the forming of the matrix; and it also has to do with affecting the influence had by the porous mold substance upon the contents introduced into and held by the matrix.

I now lift the cope off of the drag and dispose it in inverted position (see Figure 10). Then I remove the pattern object from the drag. 16 designates a gate which extends from the exterior of the mold to the matrix, in the present instance, to the forward end thereof. At this stage, the cope and the drag are in the positions, respectively, as in Figures 10 and 11. The next step is to pour into the matrix of the drag and to a shallow depth a charge of latex of the consistency of heavy cream, and then work same with a suitable implement such as a soft brush throughout the full area of the matrix and until every extremity of the matrix will have been filled, and all air bubbles will have been expelled from the latex. When this charge of latex will have thickened a predetermined degree, a further charge of latex is deposited to a depth of about one half the matrix. When the matrix content so provided will have shrunken, the hook 18 is disposed in such position as may be desired, as shown in Figure 9.

Simultaneously with, or immediately following the performance just described, is a procedure similar thereto in all respects with regard to the cope, except of course as to the hook.

The cope is now reversed from its position as shown in Figure 10, and in inverted status is deposited upon the drag, as shown in Figure 12. It will be understood that by the nature of the content of the matrix of the drag, and of the cope, it is of such viscosity at this stage as to be suitably retentive.

Now the final step is as follows: By the use of a suitable injecting implement (not shown) and which may be of the nature of a syringe or fluid pump, a further charge of latex is introduced; this time, through the gate. The quantity of latex which is injected is determined with regard to the degree of resiliency desired in the finished product. The exterior or wall portions of the casting having become set to the conformation of the matrix, the fullness of body structure is assured regardless as to whether the interior portion of the body is completely filled.

My new method of mold making just described lends itself to the creation of reproduction of natural objects in variety, the resultant images being of types suitable in markets of wide range in the activities of commerce, industries and the arts, and enables the handling of the latter in such manner that there is practicable the tinting thereof in any of many different predetermined colors.

Whereas I have described what I consider as the best manner and the most effective way of practicing my invention, and have specified the same as being typical, it will be understood that minor modifications may be made in instances where variations may be suggested, without departing from the spirit of the invention or departing from its principles.

What I claim as my invention, is

1. A process of preparing a mold in which to make a facsimile reproduction in latex or rubber, of a natural object, consisting of applying a film of oil on the surface of every part and detail of said object selected to be reproduced, and of applying a coating of lacquer on the oil covered surface of every part and detail of said object thereby constituting an integument separably enveloping said object, and then after the said integument will have set, applying a porous setting plaster mass over said enveloped object and permitting it to become hardened, and then removing the object from said mass.

2. A process of preparing a soft natural object for use as a pattern from which a cast is to be made in a plaster mold, consisting of spraying a film of oil over every part and detail of the said natural object, and of spraying a self hardening varnish compound over said oil covered object and permitting said varnish compound to become set, to constitute a rigid integument enveloping the latter to stay said object against change of contour.

3. The procedure of making a mold, by the use of a soft natural object as a pattern, and in which said mold is to be produced a cast in latex, consisting of applying a film of oil upon every part and detail of said object, applying a self hardening varnish to constitute a sheathing of said oil covered object, and after said sheathing will have hardened, then applying over every part and detail of said object so enveloped, a liquid solution of molding plaster to constitute a plastic mass of predetermined thickness, and then, after the latter will have reached the peak of its temperature and become stable, separating the natural object from said mass.

4. The process of making a mold, by the use of a soft natural object as a pattern, and in which said mold is to be produced a cast in latex, consisting of spraying a film of oil to cover every part and detail of said pattern object, spraying successive coatings of lacquer to constitute an integument enveloping said oil covered pattern object, and after said lacquer integument will have hardened, then applying over said enveloped pattern object, a liquid solution of porous molding material consisting of lime slaked to the consistency of thick cream, and then, after the latter will have reached the peak of its temperature and become stable, removing the said pattern object from said mass.

JOSEPH B. LENNINGTON.